United States Patent [19]

Nehmey et al.

[11] 4,401,612

[45] Aug. 30, 1983

[54] METHOD AND APPARATUS FOR EXTRUDING FOAM POLYMERIC MATERIALS INVOLVING THE USE OF AN EXTRUSION SCREW HAVING SPACED MULTIPLE FLIGHT MIXING MEANS THEREON

[75] Inventors: Sam D. Nehmey, Lorain; James W. Summers, Bay Village, both of Ohio

[73] Assignee: The B. F. Goodrich Company, Akron, Ohio

[21] Appl. No.: 274,619

[22] Filed: Jun. 17, 1981

[51] Int. Cl.³ .................... B29D 27/00; B29F 3/02
[52] U.S. Cl. .................... 264/53; 264/DIG. 5; 366/319; 366/323; 366/324; 425/208; 425/209; 425/817 C; 521/145
[58] Field of Search ........... 264/53, 51, 45.9, 53, 264/DIG. 5; 425/208, 209, 817 C; 521/145; 366/319, 323, 324

[56] References Cited

U.S. PATENT DOCUMENTS

| | | | |
|---|---|---|---|
| Re. 28,901 | 7/1976 | Kim | 425/208 |
| 2,662,243 | 12/1953 | Schnuck et al. | 425/208 X |
| 3,248,469 | 4/1966 | Kosinsky et al. | 425/208 X |
| 3,344,215 | 9/1967 | De Witz et al. | 264/53 |
| 3,366,580 | 1/1968 | Kraemer et al. | 521/145 |
| 3,440,309 | 4/1969 | Breukink et al. | 264/53 |
| 3,485,774 | 12/1969 | McKenica | 264/53 X |
| 3,523,988 | 8/1970 | Roehr et al. | 264/53 X |
| 3,787,542 | 1/1974 | Gallagher et al. | 264/51 |
| 3,788,612 | 1/1974 | Dray | 425/208 X |
| 3,827,841 | 8/1974 | Kawai et al. | 264/51 X |
| 3,856,442 | 12/1974 | Gallagher et al. | 264/51 X |
| 4,099,897 | 7/1978 | Takano et al. | 264/45.9 X |

FOREIGN PATENT DOCUMENTS

| | | | |
|---|---|---|---|
| 2558638 | 7/1977 | Fed. Rep. of Germany | 425/208 |
| 43-24493 | 10/1968 | Japan | 425/208 |
| 52-39758 | 3/1977 | Japan | 425/208 |

*Primary Examiner*—Philip E. Anderson
*Attorney, Agent, or Firm*—George A. Kap

[57] ABSTRACT

Cellular chlorinated polyvinyl chloride resin is made in an extruder that is characterized by a combination of multiple flights and a plurality of open slots in the mixing section to facilitate mixing of the resin and a blowing agent whereby a rigid thermoplastic cellular product of low density is made that has a predominantly closed cell structure.

10 Claims, 2 Drawing Figures

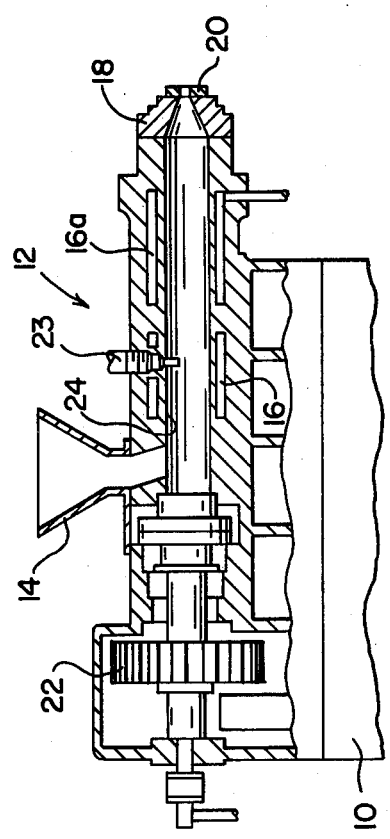

METHOD AND APPARATUS FOR EXTRUDING FOAM POLYMERIC MATERIALS INVOLVING THE USE OF AN EXTRUSION SCREW HAVING SPACED MULTIPLE FLIGHT MIXING MEANS THEREON

BACKGROUND OF THE INVENTION

Extrusion of low density foam, such as polystyrene, can be carried out with the use of two extrusion screws with a total of three stages. In the first stage of the first screw, the resin is melted, usually at high extruder speed. In the second stage of the first screw, a blowing agent is injected into the melted resin and mixed therewith sufficiently to allow the blowing agent to dissolve in the resin. In the third stage, the second screw, the uniform mixture is cooled to increase viscosity of the resin and to reduce vapor pressure of the blowing agent sufficiently so that blowing does not rupture the bubbles.

U.S. Pat. No. Re. 28,901 to Kim discloses apparatus for extruding polymeric material that is characterized by a screw flight that has a larger root diameter than other flights.

SUMMARY OF THE INVENTION

A polymeric resin is extruded herein with a single extrusion screw provided with a feed section for introducing a resin, a melt section, section for injecting a blowing agent, and a section for mixing the resin and the blowing agent where the blowing agent also dissolves in the resin. A dam in the form of a ring positioned immediately upstream of the injection section serves to prevent the blowing agent from making its way towards the feed end of the screw. The mixing and dissolving section comprises multiple screw flights, one of which scrapes the barrel of the extruder whereas the others are of a lesser radial extent allowing some of the melted resin to spill over into the adjacent upstream channel and thus promote mixing of the materials. The mixing and dissolving section also includes a plurality of slots devoid of flights which slots also facilitate and thus contribute to the mixing of the materials.

BRIEF DESCRIPTION OF THE DRAWINGS

FIG. 1 is a side elevational view partly in cross-section of an extruder without the feed screw; and FIG. 2 is a side elevational view of the extruder screw.

DETAILED DESCRIPTION OF THE INVENTION

The invention disclosed herein pertains to a method for extruding polymeric resin foam, such as chlorinated polyvinyl chloride low density foam and to the extruding apparatus for accomplishing same. The apparatus shown in FIG. 1 includes base 10 of an extruder that is generally designated by reference numeral 12. Extruder 12 has a hopper 14, heating means 16 and cooling means 16a for circulating oil, water or another medium, an extruder head 18, a die 20, transmission means 22 driven by a suitable motor, and a barrel or cylinder 24 in which extrusion screw 25, shown in FIG. 2, is journalled for rotation. Injection conduit 23 is positioned downstream of the hopper and serves to introduce a blowing agent into the molten feed material.

As shown in FIG. 2, extrusion screw 25 comprises feed section 26, melt section 28, injection section 30, and mixing/dissolving section 32. Although extent of each section can vary due to variations in the resin, its particle size, speed of extrusion screw, cooling rate, etc., generally, however, based on a screw of 25 to 30 length-/diameter (L/D), relative length of the feed section will be 0 to 8 L/D, the melt section will be 4 to 12 L/D, injection section will be about 1 L/D, and mixing/dissolving section will be 6 to 16 L/D. The portion of the screw identified as feed and melt sections is characterized, in a preferred embodiment, by a helical screw flight 34 of constant pitch disposed on core 36 of increasing cross-section from the feed section to the end of the melt section. It should be understood, however, that multiple flights and variable pitches can be used, as well as a core of uniform cross-section. The function of the screw in the feed and melt sections is to feed a particulate resin into screw channels and gradually melt the resin as it is advanced to the injection section where the blowing agent is introduced into the extruder. Heat is provided externally to melt the resin.

At the terminal extent of the melt section is provided a dam 38 which is in the form of a circumferential ring mounted on core 36. The purpose of dam 38 is to block passage of the blowing agent to the feed section of the screw. Radial extent of dam 38 is somewhat less than the root diameter of helical flight 34 in order to permit molten resin to be introduced into the injection section 30. During normal operation of the extrusion apparatus, the circumferential gap between the dam and the extruder cylinder is clogged with molten resin which is being forced into the injection section. This clogging condition prevents the blowing agent from penetrating into the melt section. The dam can be a steel ring formed integrally with screw core 36 or it can be a separable ring securely mounted on the core.

Injection section 30 is characterized by being free of helical flights; it is a bare core that is defined by dam 38 on the upstream end and multiple helical flights of the mixing/dissolving section on the downstream end. A suitable blowing agent is introduced into the injection section and mixed with the molten resin.

The mixing/dissolving section 32 is designed to promote mixing of the blowing agent in the resin and at the same time to allow the blowing agent to dissolve in the resin. Success of the final cellular product depends mainly on performance of the mixing/dissolving section that includes multiple helical flights 40, 42, 44 and 46. Fewer or additional flights can be provided if it is deemed necessary to achieve improved mixing. The core in the mixing/dissolving section is preferably of a uniform cross-section and the flights have a constant pitch. Although the other flights have the same root diameter, flight 46 has a greater root diameter and is designed so that it scrapes the extrusion cylinder or its radial extent is such as to prevent any significant amount of the resin to flow in the gaps between flight 46 and cylinder 24. Flight 46 will also be referred to hereinafter as the major flight whereas flights 40, 42 and 44 will be referred to as minor flights. The root diameter differential between major and minor flights allows for sufficient clearance between minor flights 40, 42 and 44 and cylinder 20 so that a portion of the molten resin in a channel can flow into adjacent upstream channel and thence to another upstream channel. This action of the resin provides for mixing of the resin from different channels and promotes overall mixing of the molten resin and the blowing agent throughout the axial extent of the mixing/dissolving section. This upstream advance of the resin is arrested by major flight 46 and thus the resin residing in the channel defined by major flight 46 at the upstream end and the next adjacent minor flight at the downstream end is advanced by rotation of the extrusion screw.

The mixing/dissolving section 32 also includes a plurality of spaced open slots 48. Although three open slots are shown in FIG. 2, any number can be provided to promote mixing. It was discovered that the variable root diameter of screw flights did not provide adequate mixing and only in combination with the open slots 48, the desired mixing of the resin and the blowing agent was achieved whereby a cellular product of predominantly closed cell structure and with uniform cell distribution could be produced. These open slots are about $\frac{1}{3}$ L/D in axial extent and are characterized by having the flights removed. The slots are defined by an unobstructed annular space or zone and screw flights at both axial extremities.

The molten resin mixture containing a blowing agent is advanced by the extrusion screw through a constricted section in extruder head 18 which is characterized by an axially diminishing cross-sectional area in the downstream direction. The molten resin mixture is then forced through a die 20 into a zone of lower pressure, not shown, whereupon the blowing agent expands to form a thermoplastic rigid, cellular product.

The width of the channels in the feed and melt sections are preferably constant in order to maximize exposure of the solid resin to the heated extruder cylinder. As the solid resin starts to melt and thus contract in volume, core 36 of the extruder screw 25 is gradually and uniformly increased in the downstream direction. This reduction in channel volume is designed to maintain the remaining solid resin in contact with the heated cylinder in order to accelerate its melting process.

The resin entering the injection section is in a molten state. A blowing agent, such as trichloromonofluoromethane, is injected into the molten resin and mixing thereof commences when the resin and the blowing agent are introduced into the multiple helical flights of the mixing/dissolving section. The resin is advanced by the helical flights with a portion thereof spilling over into the adjacent upstream channel over the minor flights that provide sufficient clearance between the flights and the extruder cylinder. This process is repeated each time another minor flight is encountered upstream. The major flight has a sufficiently small clearance with the extruder cylinder to enable it to advance essentially all of the resin in the channel. The mixing that takes place in the channels of the multiple flights is further enhanced when the mixture of resin and blowing agent enters the open slots 48. Since the flights are interrupted in the open slots, the mixture of resin and blowing agent is delivered into the open slots where the streams from different flights are allowed to mix due to the back pressure that is developed by the flights that define the downstream extremity of the open slot. The mixture is forced out of the open slot and conveyed by the multiple flights whereby additional mixing takes place. The mixing process that takes place in the channels of the multiple flights and the open slots is repeated as many times as might be necessary in order to obtain a cellular product with a uniformly distributed closed cell structure. In the preferred embodiment, three equidistant open slots in the mixing/dissolving section were found to be adequate.

The extruder described herein is provided with a heating means to melt the resin and a cooling means in the mixing section. The cooling means is used to increase viscosity of the resin and to reduce vapor pressure of the blowing agent. Concomitant result of these effects is to enable the resin to retain the blowing agent until the resin and the blowing agent are introduced into a zone of lower pressure where foaming takes place. Due to efficient mixing achieved in this apparatus, the resin is subjected to lower temperatures and yet full plastication and thorough mixing are attained. Furthermore, with such mixing, average temperature throughout the extruder is lower and more uniform.

With the above-noted improvements, chlorinated polyvinyl chloride is exposed to lower temperatures for shorter durations with the consequent shorter heat treatment history. The temperature profile of the extruder is as follows: 320° to 360° F. in the feed section, 340° to 400° F. in the melt section, 200° to 240° F. in the injection section 190° to 240° F. in the mixing section, and 290° to 340° F. in the extrusion die.

The preferred feed resin, in powder or pellet form, is chlorinated polyvinyl chloride with a minimum chlorine content of at least 60% by weight while for practical purposes, the maximum chlorine content feasible is about 75% by weight. Preferably, the chlorine content is about 64 to 73% by weight. As the chlorine content of the resin is increased from 60% to 64%, ability of the resin to tolerate high temperatures is increased from about 80° C. to about 100° C., thus enabling the polymer to better withstand contact with hot objects. Furthermore, increasing chlorine content of the resin from 60% to 64% also makes it easier to retain the blowing agents within the resin. The resin can be stabilized by admixture of known antioxidants and other known additives can be added, such as nucleating agents, etc.

In place of chlorinated polyvinyl chloride, there can be used a feed mixture of chlorinated polyvinyl chloride with a minor amount of another polymer or copolymer of vinyl chloride with a minor amount of another monomer as long as the properties of the feed materials do not differ significantly from those of chlorinated polyvinyl chloride. It is intended that the term "chlorinated polyvinyl chloride," as used herein, include the obvious variations described above.

The chlorinated polyvinyl chloride employed in the present invention can be readily prepared by the postchlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution, chlorination in an aqueous suspension or a suspension in a swelling agent, and direct chlorination of dry polyvinyl chloride powder. In our work, it has been found particularly convenient to chlorinate the polyvinyl chloride in an aqueous suspension. A typical procedure for carrying out such chlorination comprises agitating an aqueous suspension of 15 parts by weight of polyvinyl chloride and 100 parts by weight of water in a pressure vessel that has been purged with nitrogen, heating the suspension to 140° C. and introducing chlorine at a rate of about 2 parts by weight per hour until the polyvinyl chloride has been chlorinated to the desired extent.

Other suitable feed resins include homopolymers and interpolymers of cellulose ethers and esters; olefins such as ethylene and propylene; vinyl esters of carboxylic acids such as vinyl acetate and vinyl benzoate; vinyl ethers such as vinyl methyl ether; unsaturated carboxylic acids and derivatives thereof, such as acrylic and methacrylic acids and esters thereof with alcohols of 1 to 18 carbon atoms such as methyl and ethyl acrylate and methacrylate, acrylamide, and acrylonitrile; vinyl aromatic compounds such as styrene, alpha-methylstyrene, vinyl toluenes, and vinyl naphthalene. The group of vinyl aromatic resins includes styrene homopolymers and copolymers thereof with up to 50% of a vinylidene monomer such as butadiene, acrylonitrile, alpha-methylstyrene, etc. Also included are vinyl chloride homopolymers and copolymers containing at least 20 preferably about 60 mole percent of vinyl chloride.

Suitable blowing agents are the halogenated hydrocarbons containing 1 to 3 carbon atoms such as methyl chloride, methylene chloride, ethyl chloride, ethylene dichloride, n-propyl chloride, and methyl bromide. A preferred group of halogenated hydrocarbon blowing agents are chlorofluoroalkanes of from 1 to 2 carbon atoms such as trichloromonofluoromethane, dichlorodifluoromethane, dichloromonofluoromethane, monochlorodifluoromethane, trichlorotrifluoroethane, dichlorotetrafluoroethane, and monochlorotrifluoroethane. Although the blowing agent can be used in an amount of about 5% to 50%, it is preferred to have a quantity of blowing agent from about 10% to 40% by weight of the feed polymer resin absorbed in the polymer at the commencement of the foaming procedure.

The cellular products produced by the method and apparatus described herein can be characterized as low density foams of polymeric materials having a density of 1 to 20 lbs/ft³ and a predominantly closed cell structure in which at least about 60% of the cells are closed. Preferred foams, however, have a density of about 1 to 10 lbs/ft³, a predominantly closed cell structure containing at least about 85% closed cells, and containing a chlorofluoroalkane of 1 to 4 carbon atoms.

The following example is provided to illustrate the invention disclosed herein in greater detail, however, the invention is not to be construed as being limited thereby in any way.

EXAMPLE

A chlorinated polyvinyl chloride formulation was made using 100 parts by weight chlorinated PVC resin powder containing 67% chlorine, 3 parts butyl tin stabilizer, 3 parts of chlorinated polyethylene, 1.8 parts lubricant that was a mixture of calcium stearate, ethylene bisstearamide, and an ester of Montan wax, 10 parts styrene-acrylonitrile processing aid, and 1.3 parts nucleating agent that consisted of titanium dioxide and azobisdicarbonamide. This was melted on a mixer and mill, then cubed into shapes of ⅛" on a side. Extrusion was done on a 1½ inch extruder with a screw having 16 L/D compression or melt section. The screw depth at the feed end was 0.270 inches and at the end of the melt section was 0.108 inches. Feed rate was 14 lbs/hr and the screw was operated at 20 rpm. The melt passed over a dam having a clearance of 0.070 inches and length of ¼ inch. Trichlorofluoromethane (Freon 11) was pumped into the injection section at 3 lbs/hr at injection pressure of 3000 psi having a depth of 0.180 inches and length of 1 L/D. Mixing, dissolving, and cooling was done in a four flighted screw section of 10 L/D and depth of 0.180 inches. One screw flight scraped the barrel wall; the other three had clearances of 0.060 inches. Three slots interrupting the screw flights were located equally spaced in the mixing, dissolving, and cooling section. Each slot had a ⅛ L/D length. The melt was extruded into a slot die of approximately 1.4 inches width and 0.067 inches thickness. Head pressure was 1700 psi. This made a foamed board of ⅜ inch by 4 inch having a density of 2.3 pounds per cubic foot and having essentially 100% closed cells of 100–200 micrometer diameter. Temperature profile for this extruder is given for the four zones, identified in FIG. 2, and was as follows:

| Zone No. | 1 | 2 | 3 | 4 |
| --- | --- | --- | --- | --- |
| Temperature, °F. | 340 | 344 | 330 | 300 |

We claim:

1. Method for extruding a cellular polymeric material with an extruder having disposed therein an elongated screw comprising charging a particulate polymeric material into the feed section of the extruder, advancing said material through the melt section of the extruder where said material is progressively converted from a solid to a molten state, injecting a blowing agent into said molten material at the injection section of the extruder to form a mixture of said material and the blowing agent, advancing said mixture through a mixing section of the extruder, agitating said mixture in said mixing section by means of rotating multiple screw flights on the screw, further agitating said mixture in at least one open slot provided on the screw in the mixing section, advancing said mixture from the open slot by means of the multiple flights while agitating same, and extruding said mixture whereby the blowing agent expands to form a cellular product.

2. Method of claim 1 wherein agitation of said mixture by means of the rotating flights includes the step of mixing the mixture by allowing some of it to pass over the minor flights into adjacent upstream channels in the flights and become comingled with the mixture therein.

3. Method of claim 2 wherein said polymeric material is CPVC in powder form, said method further including the step of alternating a plurality of times agitation by means of the screw flights and agitation in the open slot as the mixture is advanced through the mixing section, agitation by means of the screw flights includes the step of arresting the upstream advance of a portion of the mixture by means of a major flight.

4. Method of claim 3 which includes the step of damming the upstream end of the injection section to prevent seepage of said blowing agent upstream, agitating by means of screw flights is carried out 3 to 5 times and agitation in the open slots is carried out alternately 2 to 4 times.

5. Method of claim 4 wherein temperature in the feed section is about 320° to 360° F., temperature in the melt section is 340° to 400° F., temperature in the injection section is about 200° to 240° F., temperature in the mixing section is about 190° to 240° F., and temperature at the extrusion die is about 290° to 340° F., said blowing agent is used in amount of 5 to 50% by weight of chlorinated polyvinyl chloride and is selected from chlorofluoroalkanes of 1 to 2 carbon atoms.

6. In an extrusion apparatus for processing a particulate polymeric material comprising a cylinder, an extrusion screw rotatably mounted in said cylinder and longitudinally extending therein for advancing the polymeric material therethrough that is progressively changed from a solid to a molten form, and a die means at the downstream end of said apparatus through which the polymeric material is extruded in a cellular state, said extrusion screw comprising a feed section where the polymeric material is introduced into said apparatus, a melt section where the polymeric material is progressively converted from a solid to a fluid state, injection section for introducing a blowing agent, and a mixing section where the polymeric material and the blowing agent are agitated to make a mixture of the polymeric material and the blowing agent, the improvement comprising said mixing section provided with multiple screw flights disposed on a core of said screw for advancing the mixture and at least one continuous annular open slot that is an annular zone devoid of said flights where further agitation of the mixture is carried out, said slots comprise an unobstructed annular space defined by said multiple flights at both axial extremities of said slots.

7. Apparatus of claim 6 wherein said multiple flights comprise 2 to 6 flights, at least one of which is a major flight and remaining being minor flights; the polymeric material is chlorinated polyvinyl chloride; the blowing agent is selected from chlorofluoroalkanes containing 1 to 2 carbon atoms; and said slots are defined in radial extent by the core of said screw that has an increasing cross-section through said feed section and melt section but has a constant cross-section through said injection section and mixing section.

8. Apparatus of claim 2 wherein said open slots are about ⅓ L/D in axial extent.

9. Apparatus of claim 8 wherein there are three spaced open slots in said mixing section, and there are four flights in said mixing section.

10. Appartus of claim 7 which includes a dam on the upstream end of said injection section for preventing seepage of a gaseous blowing agent upstream from the injection section, said mixing section being about 6 to 16 L/D in length and comprises 3 to 5 screw flights and at least 2 open slots.

* * * * *